United States Patent [19]

Wenz

[11] Patent Number: 5,545,280
[45] Date of Patent: Aug. 13, 1996

[54] METHOD OF SELECTIVELY APPLYING ADHESIVE TO PROTRUSIONS ON A SUBSTRATE

[75] Inventor: Robert P. Wenz, Cottage Grove, Minn.

[73] Assignee: Minnesota Mining and Manufacturing Company, St. Paul, Minn.

[21] Appl. No.: 485,649

[22] Filed: Jun. 7, 1995

Related U.S. Application Data

[60] Continuation of Ser. No. 121,044, Sep. 13, 1993, abandoned, which is a division of Ser. No. 821,630, Jan. 16, 1992, Pat. No. 5,268,782.

[51] Int. Cl.$^6$ ............................ B05D 5/10; B32B 7/14
[52] U.S. Cl. ......................... 156/234; 156/235; 156/291; 427/207.1
[58] Field of Search ............................ 156/234, 235, 156/291, 330; 427/207.1, 256

[56] References Cited

U.S. PATENT DOCUMENTS

| | | |
|---|---|---|
| 3,661,440 | 5/1972 | Matthies . |
| 3,689,346 | 9/1972 | Rowland . |
| 3,861,783 | 1/1975 | Dill et al. . |
| 3,863,332 | 2/1975 | Leupp et al. . |
| 3,978,580 | 9/1976 | Leupp et al. . |
| 4,244,683 | 1/1981 | Rowland . |
| 4,264,149 | 4/1981 | de Zwart et al. . |
| 4,284,457 | 8/1981 | Stonier ................................ 156/237 |
| 4,367,924 | 1/1983 | Clark . |
| 4,465,538 | 8/1984 | Schmoock ............................ 156/234 |
| 4,501,471 | 2/1985 | Calley . |
| 4,563,059 | 1/1986 | Clark . |
| 4,576,850 | 3/1986 | Martens . |
| 4,582,886 | 4/1986 | Ryang ................................... 528/28 |
| 4,678,284 | 7/1987 | Tashiro . |
| 4,678,529 | 7/1987 | Drake et al. ......................... 156/234 |
| 4,720,173 | 1/1988 | Okada et al. . |
| 4,744,639 | 5/1988 | Tsuboyama . |
| 4,751,509 | 6/1988 | Kubata et al. . |
| 4,834,500 | 5/1989 | Kerr et al. . |
| 4,842,377 | 7/1989 | Nakanowatari . |
| 4,875,259 | 10/1989 | Appeldorn . |
| 4,886,619 | 12/1989 | Janulis . |
| 4,952,036 | 8/1990 | Gulick et al. . |

FOREIGN PATENT DOCUMENTS

| | | |
|---|---|---|
| 61-0028719 | 2/1983 | Japan . |
| 61-002130 | 1/1986 | Japan . |

OTHER PUBLICATIONS

*World Scientific*, vol. 1, "Liquid Crystals Applications and Uses", edited by Bahadur, Birendra, World Scientific Publishing Co. Pte. Ltd., 1990.

*Japanese Journal of Applied Physics*, vol. 22, No. 2, Feb., 1983, pp. L85–L87, "A Practical Method of Preparing Thin Homogeneous Ferroelectric Smectic Cells for Electro–Optical Microsecond Switches: Alignment Control of Liquid Crystal Molecules by Utilizing Spacer Edges".

*SID Digest*, 1985, pp. 84–85, "Twisted–Nematic Liquid–Crystal Full–Color Display Panel with Reduced Rotatory Dispersion.; *SID Digest*, 1988, pp. 232–234, A 1 Mega–Pizel Color a–Si TFT Liquid–Crystal Display".

Addy et al, "Spaced Liquid Crystal Display", IBM, vol. 23, No. 5, Oct., 1980.

*Primary Examiner*—Daniel J. Stemmer
*Attorney, Agent, or Firm*—Gary L. Griswold; Walter N. Kirn; Eric D. Levinson

[57] ABSTRACT

A method of selectively applying adhesive to the tops of ribs on a ribbed-substrate. The method includes the steps of applying a layer of adhesive to a flexible, polyimide carrier; drying the adhesive layer; rolling the ribbed substrate against the carrier so that the adhesive layer contacts the rib tops but does not contact the substrate in the regions between the ribs; and separating the adhesive from the carrier, thereby depositing the adhesive on the rib tops. The ribs typically have heights and widths from about 1 to 10 μm, and are separated by distances of 1 to 10 times those dimensions.

7 Claims, 5 Drawing Sheets

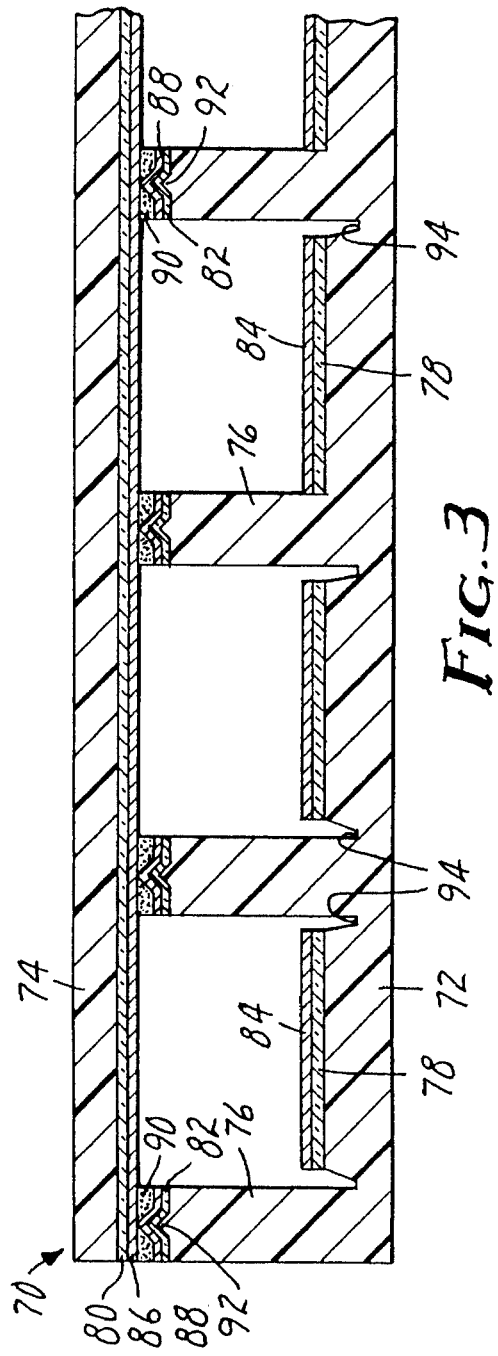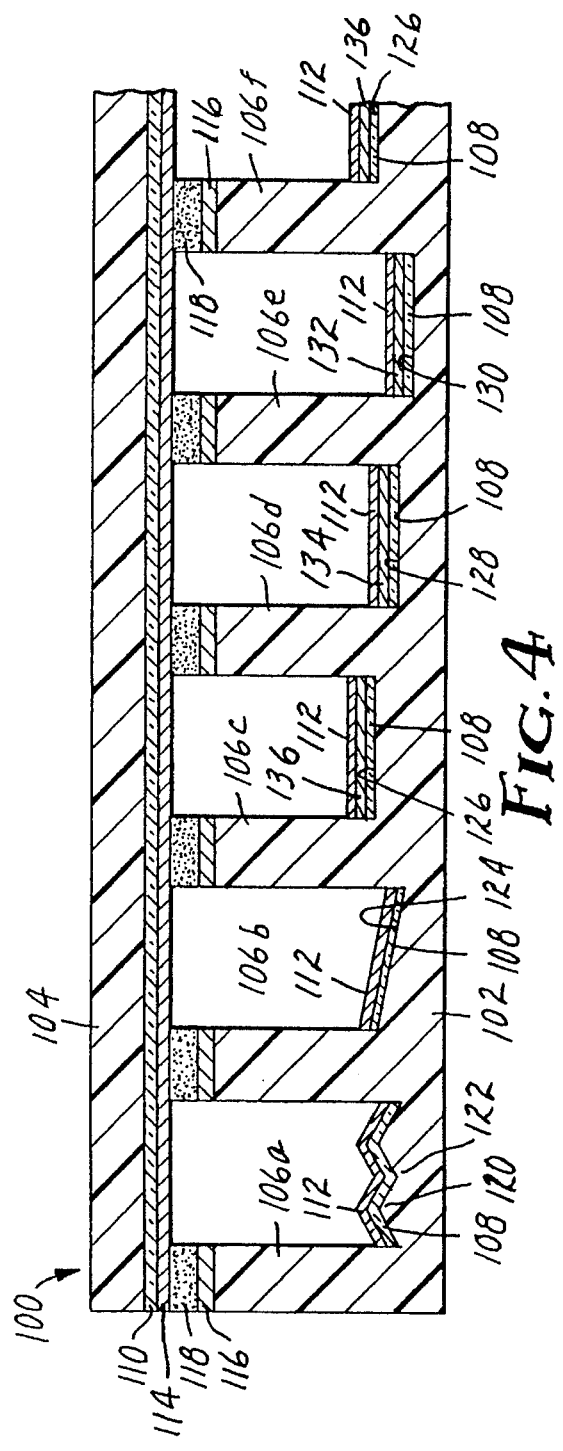

METHOD OF SELECTIVELY APPLYING ADHESIVE TO PROTRUSIONS ON A SUBSTRATE

This is a continuation of application Ser. No. 08/121,044 filed Sep. 13, 1993, now abandoned, which is a division of application Ser. No. 07/821,630, filed Jan. 16, 1992 now U.S. Pat. No. 5,268,782.

FIELD OF THE INVENTION

The present invention relates to a substrate material useful for making liquid crystal displays and display devices made therefrom. More particularly, this invention relates to grooved, polymeric substrates having integral spacing ridges to allow the use of flexible substrates while still maintaining the necessary spacing between device walls.

BACKGROUND OF THE INVENTION

Liquid crystal display (LCD) devices are well known and are useful in a number of applications where light weight, low power and a flat panel display are desired. Typically, these devices comprise a pair of sheet-like, glass substrate elements or "half-cells" overlying one another with liquid crystal material confined between the glass substrates. The substrates are sealed at their periphery with a sealant to form the cell or device. Transparent electrodes are generally applied to the interior surface of the substrates to allow the application of an electric field at various points on the substrates thereby forming addressable pixel areas on the display.

Various types of liquid crystal materials are known in the art and are useful in devices referred to as twisted nematic (TN), super twisted nematic (STN) and ferroelectric display devices. The ferroelectric liquid crystals are particularly useful due to their bistable characteristics and fast switching times. Ferroelectric liquid crystal materials and display devices incorporating these materials are described in U.S. Pat. No. 4,367,924 entitled "Chiral Smectic C or H Liquid Crystal Electro-Optical Device" and U.S. Pat. No. 4,563,059 entitled "Surface Stabilized Ferroelectric Liquid Crystal Devices".

It is desirable to be able to manufacture large area displays of relatively light weight for use in portable devices such as computers and with overhead projectors and the like. Certain organic, polymeric substrates are much lighter than glass while being transparent and are therefore preferred for use over glass in large area, lightweight displays. However, a problem with the use of polymeric materials as substrates for liquid crystal displays is that these substrates tend to be more flexible than glass and must be separated by a dense population of spacers in order to maintain uniform separation between the closely spaced substrates forming the liquid crystal display device. In order to produce a uniform electric field at low voltages and show uniform contrast across the entire display area, precise control of the shallow cavity containing the liquid crystal material is required. This problem is even more severe with surface stabilized ferroelectric liquid crystal displays which require a nominal 2 μm spacing controlled to within 0.1 μm for good results.

The prior art means for achieving the required spacing uniformity uses either precisely dimensioned, short-length polymeric fibers or spheres as in U.S. Pat. No. 4,501,471 or spacing members made of photoresist material bonded to the substrate as in U.S. Pat. No. 4,720,173. Each of these methods has deficiencies. Fiber and spheroidal spacing particles are not easily placed uniformly on the substrate to maintain even spacing over the entire area and fibers may overlap increasing the-spacer height. Moreover, when the device flexes or is otherwise physically stressed, the spacers may shift or migrate to cause starved areas in the display cell. Bonded structural members require that they be precisely positioned on each substrate with exactly the same height, a feat that is difficult given the dimensions and tolerances required for effective liquid crystal displays. Members having different chemical composition from the substrate may suffer from differential thermal expansion causing possible fracture of the bond at the interface and shifting of the spacing member.

One drawback in extending present LCD manufacturing technology to larger areas is that it is dependent on the state of the art in large area photolithography (currently limited to less than 18 inches square) and precision polished glass technology. Presently, manufacturing yields for 4-inch diagonal display devices are low, sometimes less than 20% because of defects that can occur due to the large number of photolithographic steps involved. This poor yield translates into high display system cost. The cost of the much larger displays would be even greater.

SUMMARY OF THE INVENTION

The present invention overcomes the deficiencies of the prior art by employing a substrate element having microstructure spacing means integral with the substrate. The present invention combines the function of substrate and spacer into one integrated element referred to as a microstructured substrate element. The present invention also comprises liquid crystal display devices using such substrate elements or half-cells as well as the method of making such substrate elements.

More specifically, the present invention comprises substrate elements suitable for use as half-cells in making electrically addressable liquid crystal displays. These half-cells comprise a polymeric sheet having a microstructure profile on at least one major surface of the substrate. This profile comprises a plurality of spacing elements comprising protrusions, preferably a series of parallel ridges, physically and chemically integral with the main body of the substrate, each protrusion rising to a common level defined by a plane located above the main body of the substrate to form support for a second substrate. By "chemically integral" it is meant that the spacing elements comprise substantially the same chemical composition as the substrate and that no bonding agent or other connective layer of different chemical identity is interposed between the spacing element and the main body of the substrate. The surface surrounding the protrusions have independently addressable, electrically conductive areas.

When incorporated in a display device, a thin, transparent, conducting, layer can be applied to the substrate which allows-the application of a voltage across selected portions of the uniformly spaced liquid crystal display (LCD) cell gap. Other elements commonly associated with liquid crystal displays may also be associated with the substrates to provide a half-cell for making a useful display device.

The term "microstructure" as used herein refers to structural elements having dimensions characteristically measured in micrometers, e.g. from about 1 micrometer up to about 10 micrometers. It is the presence of these integral microstructures that distinguish the articles of the present invention from those of the prior art.

The articles of the present invention are made by known molding techniques described and exemplified hereinafter which allow microstructure features to be molded integral with the substrate. The dimensions of the features can be molded to very tight tolerances and are reproducible without significant variation. This ability to provide very precise spacing members integral with the substrate and precisely positioned over large areas allows the production of large area displays with uniform appearance over their entire area.

The method of applying adhesive to the ribs according to the present invention is referred to herein as the "tack-off" method. In this method, an adhesive is thinned in a solvent, applied uniformly to a flat substrate (carrier), dried to a few tenths of a micron thickness, and then "tacked off" onto the tops of the microstructured ribs by rolling the rib side of the microstructured surface across the thin adhesive layer. The thin adhesive never touches the channel portion of the microstructure and thus is not transferred into the channel.

The advantages of having a microstructured spacer integral with the substrate are 1) the microstructured substrate can be made highly uniform over meter-sized areas thereby providing high optical uniformity, 2) integral microstructure can be made to electrically isolate adjacent conductors, thus eliminating costly and yield-reducing photolithographic steps, and 3) the LCD manufacturing process is made simpler because the need to separately apply spacer beads or fibers or photolithographed dots or stripes is eliminated. This invention is believed useful with the ferroelectric liquid crystals as well as the TN, STN and other liquid crystal materials requiring accurate and precise spacing control for application in high definition, large format, direct-view and projection displays.

BRIEF DESCRIPTION OF THE DRAWINGS

FIGS. 3 and 4 are cross sections of a portion of a liquid crystal display device showing alternate configurations and features of the substrate according to the present invention.

The Figures shown herein are not drawn to scale or with correct relative proportions in all cases. They are offered to show the relative placement and features of the microstructured substrates of the present invention and how they are incorporated into a liquid crystal display device.

DETAILED DESCRIPTION OF THE INVENTION

Figure 1:
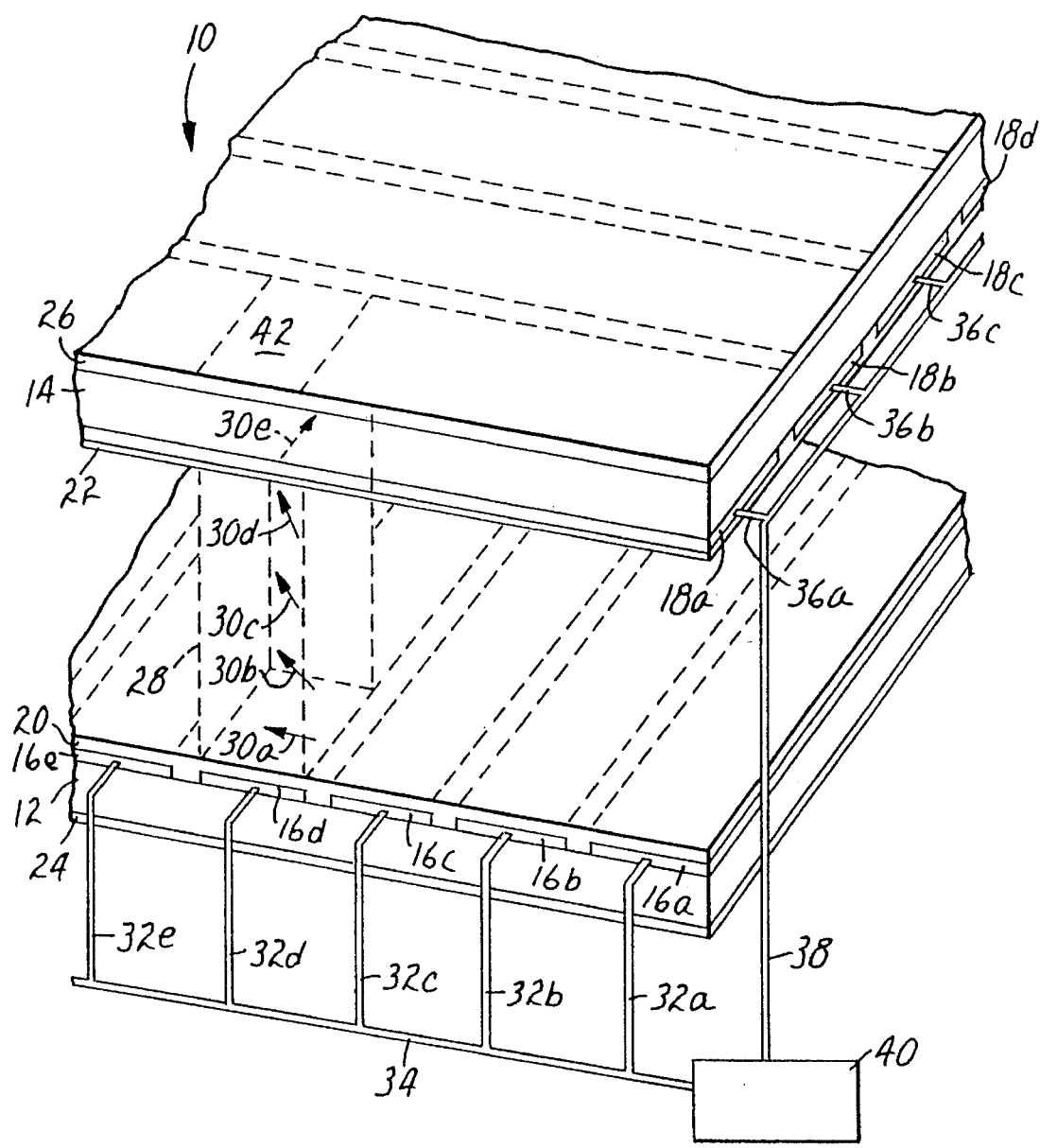
FIG. 1 is a diagrammatic, partial, isometric view of the essential elements of an illustrative liquid crystal display device and associated electronics.

Addressable liquid crystal devices are well known in the art. As shown in FIG. 1, a typical twisted nematic display device 10 known in the art comprises a cell or envelope formed by placing a pair of transparent, planar substrates 12 and 14, in register, overlying and spaced apart from one another. The periphery of the substrates are joined and sealed with an adhesive sealant (not shown) usually applied by a screen printing technique to provide an enclosed cell. The shallow space or cavity between the substrates is filled with liquid crystal material 28 just prior to final sealing. Conductive, transparent electrodes 16(a) through 16(e) and 18(a) through 18(d) are arranged on the inside surface of the substrates in either a segmented or X-Y matrix design (shown), as is well known in the art, to form a plurality of picture elements (pixels). Although only a few electrodes are shown, in practice a large number of electrodes are incorporated in the cell and the number will generally increase as the areal dimensions of the cell increase.

Alignment coatings 20, 22 are applied to portions of the interior surface of the liquid crystal display cell to cause a desired orientation of the liquid crystal material at its interface with the surface of the display. This ensures that the liquid crystal rotates light through angles which are complementary to the alignment of the polarizers associated with the cell. Polarizing elements 24, 26 are optional depending on the type of display and may be associated with one or more surfaces of the display when used. A reflector element (not shown) may be associated with the bottom substrate 12 when a reflective rather than a transmissive display is desired. In that event, bottom substrate 12 may not have to be transparent.

The components and assembly techniques of liquid crystal displays as described above are well known. Details of assembly can be found in the literature such as "Liquid Crystals-Applications and Uses", Volume 1, *Bitendra Bahadur, Ed., World Scientific Publishing Co. Pte. Ltd.* (1990), Chapter 7, "Materials and Assembling Process of LCDS."

Liquid crystal material fills the space between substrates 12 and 14, but for purposes of illustration, only a column of liquid crystal material 28 is shown corresponding to the area overlying common areas of crossed electrodes 16(d) and 18(a). Arrows 30(a) through 30(e) show how the molecules of the liquid crystal are aligned in a 90 degree twist by the alignment layers 20, 22 in the absence of an electric field. Arrows 30(a) and 30(e) also correspond to the direction of polarization of the polarizers 24 and 26, respectively.

Electrode leads 32(a) through 32(e) and 36(a) through 36(c) are shown connected to bus leads 34 and 38, respectively, which in turn are connected to addressing electronics shown schematically at 40.

Twisted nematic liquid crystal devices employ cholesteric liquid crystals which have a helical or twisted molecular orientation in the device as shown by arrows 30(a) through 30(e) in FIG. 1. When an electric field is applied to the liquid crystal material by electrodes incorporated into the device, the molecules re-orient and "unwind" due to the electrical anisotropy of the molecules. This behavior allows the molecules to rotate polarized light when in the twisted state and thereby pass light without rotation when in the untwisted state. When used in combination with polarizers, this ability to rotate polarized light allows the display to act as a light valve, either blocking or passing transmitted or reflected light. The surface 42 represents a pixel area which can be turned on or off by addressing electrodes 16(d) and 18(a) simultaneously. When individually addressable electrodes are incorporated into the display, the display device has the ability to display images.

Ferroelectric liquid crystals are also useful in display devices. These molecules have a polarization vector which aligns with an applied electric field. Thus, the application of an electric field ("field on condition") causes these liquid crystal molecules to orient in a characteristic way. Because they are bistable materials, they remain as oriented by the field even after the orienting electric field is removed ("field off condition") thereby reducing power consumption. Application of a field of different polarity can re-orient the liquid crystal materials to a different orientation characteristic of the field. Because the liquid crystals affect light differently in different orientations, they can be made to effectively switch picture elements (pixels) in a display device on and off to display information as is well known in the art. The microstructure substrate elements of the present invention have particular utility with ferroelectric liquid crystals, for example, in the attainment of a device having gray scale capability, as will be described in more detail hereinafter.

The electrodes may be addressed independently to create an electric field at selected pixels. In some addressing schemes, the electrodes are sequentially and repeatedly scanned at a rapid rate to provide moving images similar to television images. This requires "refreshing" the display at short time intervals to rapidly turn pixels on and off. In order to switch the pixels on and off rapidly with reasonable voltage levels, the layer of liquid crystal material should be uniformly thin and, thus, the spacing between the substrates becomes critical if a uniform appearance is to be achieved.

In order to allow the preparation of large area displays with uniform spacing and resulting appearance the present invention employs one or more substrates with integral spacers provided as microstructure elements integral with the substrates.

Figure 2:
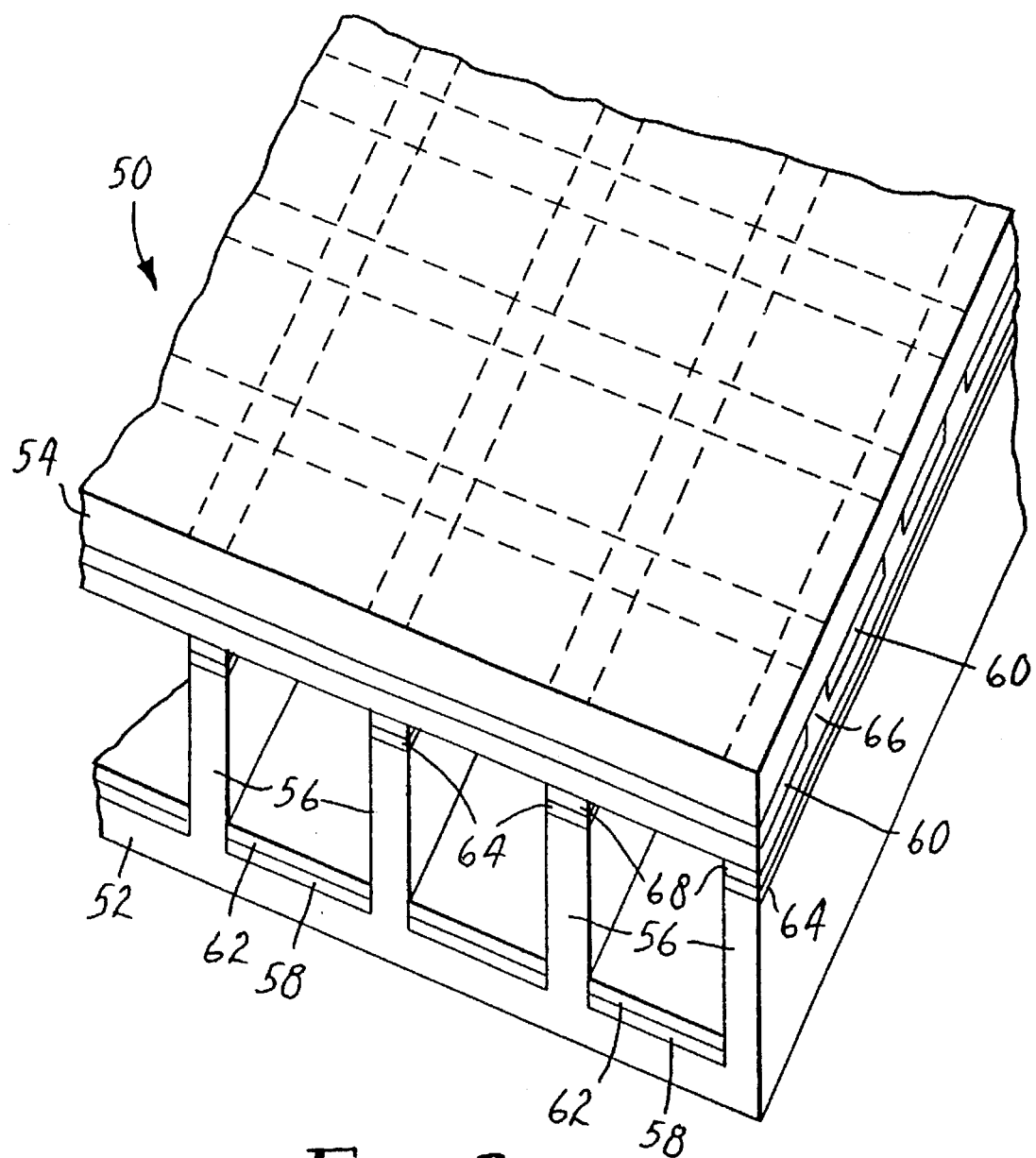
FIG. 2 is a diagrammatic, partial, isometric view of one embodiment of a liquid crystal device according to the present invention.

Referring to FIG. 2, a portion of a liquid crystal display device according to the present invention is shown wherein the device shown generally at 50 comprises transparent bottom substrate 52 and transparent top substrate 54. Microstructure spacing ribs 56 are integral with substrate 52 and rise up to a common level to support top substrate 54. Transparent conductive electrodes 58 and 60 are located on the interior of the bottom and top substrates, respectively, and are connected to a voltage source (not shown) for creating an electric field between opposed electrodes. Optional alignment material 62, 64 and 66 are shown in various locations. Alignment material 64 results from the application of alignment layer 62 on bottom substrate 52 and is covered by adhesive/sealant 68. Thus, alignment material 64 performs no alignment function and can be eliminated if desired. The top substrate 54 is bonded to the tops of spacing ribs 56 by adhesive/sealant 68 which also seals the periphery of the cell. The spacing ribs 56 together with substrates 52 and 54 form a cavity in which liquid crystal material (not shown) is disposed before the cell is sealed at its periphery with adhesive/sealant 68 to form a complete display device.

While this embodiment and others herein illustrates a series of parallel ribs as spacing elements, it will be understood that other types of protrusions can perform the function. Thus, separate posts of different geometric cross section or other forms of protrusions can serve as spacers and can be provided by the molding method described hereinafter.

The lateral distance between the protrusions or spacing elements can vary considerably depending on the particular application for the display device. The width of the spacing elements (protrusions) can range from about 1 or 2 μm up to several micrometers, e.g., 25 μm or more. The upper limit is governed by the inactive area that can be tolerated in a given display. Typically, it is desired to have at least 50% active area in a display. That is, the projected surface area of the spacing elements should occupy no more than about ½ of the total substrate surface in the display area. For a substrate where the spacing elements are of substantially equal surface dimensions, the lateral spacing between spacing elements would be at least about 1 times the width of the spacing element in the direction being measured and could be 10 times the width or more. In addition, it is generally desired to have at least about 10 pixels per cm (25 lines per inch) in a horizontal or vertical direction, up to about 120 or 240 pixels per cm (300 to 600 lines per inch) for high resolution displays and up to about 400 pixels per cm (1000 lines per inch) for very high resolution displays. With a 2 μm width spacing rib and with a 50% active area, a density of about 2,500 pixels per cm (about 6000 lines per inch) can be achieved.

Substrate 52 is preferably thermoplastic, polymeric material which can be molded as described hereinafter, is optically transparent and has reasonable dimensional stability under the conditions encountered during the manufacture and use of the display device. Thermoplastic materials which are useful in the present invention include polycarbonate, polyvinyl chloride, polystyrene, polymethyl methacrylate, polyurethane polyimide and polysulfuric polymers as well as other transparent thermoplastic polymers. Top substrate 54 which does not have the microstructure features of the bottom substrate as illustrated, is also preferably an organic polymeric material, as described above, or glass as is conventional in the art. If the top substrate also has the microstructure features described in this invention, then the substrate is preferably polymeric. Although not specifically shown, it is contemplated that top substrate 54 could be a microstructured substrate similar to that of bottom substrate 52 and would be applied with the spacing ribs contacting spacing ribs 56 and crossing at right angles to spacing ribs 56.

The electrode materials useful in the present invention are the commonly known transparent conducting oxides, such as indium-tin-oxide (ITO) and other materials commonly used in LCD's. Typically the conductive materials are vapor deposited onto the surface of the substrate by sputtering or other commonly known techniques. Because vapor deposition techniques are not able to be directed with sufficient accuracy, conductive material may be deposited on the tops of the spacing ribs. If left in place, this conductive region could possibly short across the electrode regions on the mating substrate. Various techniques can be used to remove the electrodes, for example, by burnishing the tops of the ribs after deposition, by etching the conductive layer off while protecting the desired electrode surface with photoresist, etc. When the etching technique is used, a positive photoresist is applied to the entire substrate surface. The photoresist on the tops of the ribs is exposed to light by the use of a laser selectively targeted on the rib tops or by the use of a prism atop the ribs so that light is transmitted to the photoresist at the prism/photoresist interface, but is reflected at the prism/air interface so that the photoresist over the electrodes is not exposed. The photoresist on the tops of the ribs is removed and the substrate exposed to an etchant. After the conductive layer on the tops of the ribs is removed, the photoresist over the electrode areas is stripped away and the alignment coating and/or other materials applied as desired.

The alignment compositions useful in the present invention are also well known in the art. These are various polymeric materials applied from solvents by spin coating or other techniques commonly used which will apply a thin, uniform coating across the surface of the substrate. Once applied, these materials are dried and rubbed with cloth or other materials to provide an orienting surface which will align liquid crystal molecules in contact with the surface. A preferred alignment material is a nylon polymer which can be solvent coated and rubbed with cloth, such as velvet, to provide a useful alignment layer.

A wide variety of adhesive/sealant materials are known and useful. Polymerizable organic materials are commonly used with plastic substrates and with glass. Heat curing epoxies are well known and have good strength while being relatively impervious to attack by liquid crystal compounds. Light curing adhesives are also commonly used and have the advantage of eliminating the stresses induced by a heat curing process. Acrylate adhesives are common UV curable adhesives useful in the present invention. In some cases, ultrasonic bonding may be used so that the adhesive may be eliminated with bonding and sealing occurring due to the heating, flowing and re-solidifying of the substrate material itself.

In order to provide optical uniformity over the microstructure-spaced LCD, it is necessary to assure that the ribs remain in contact with the mating substrate of the LCD cell so that the design spacing is maintained. One solution is to adhesively bond each spacer rib to the mating substrate. This is not a simple matter since the ribs are only a few microns high while adhesives are usually coated to several microns in thickness. Conventional coating methods such as knife coating, gravure coating, etc., would produce too thick a coating and would also put adhesive in the channels which would prevent filling with liquid crystal.

One method of applying adhesive to the ribs has now been discovered and is referred to as the "tack-off" method. In this method an adhesive is thinned in a solvent, applied uniformly to a flat substrate (carrier), dried to a few tenths of a micron thickness, and then "tacked off" onto the tops of the microstructured ribs by rolling the rib side of the microstructured surface across the thin adhesive layer and separating the substrate and the microstructured surface. The thin adhesive never touches the channel portion of the microstructure and thus is not transferred into the channel.

FIG. 3 shows an alternative embodiment of the present invention. Display device 70 comprises bottom and top substrates 72 and 74, integral spacing ribs 76, transparent conductive material 78, 80, 82, alignment material 84, 86, 88 and bonding/sealing adhesive 90. Spacer ribs 76 are also shown with supporting peaks 92. The purpose of the peaks is to provide features which aid in ultrasonic bonding of the substrates by concentrating the ultrasonic energy at the peak. Where adhesive bonding is used, the peak acts as a spacer to maintain a minimum thickness of adhesive when the top substrate is pressed down on the spacers. Without the peak, pressing the top substrate onto the spacers may result in an adhesive layer which may be excessively thick if too little pressure is applied or an adhesive layer which is excessively thin if too much pressure is applied resulting in a weak bond and a possible failure point. In any event, uneven pressure may result in uneven spacing of the top and bottom substrates which is undesirable. The peaks help to minimize this effect.

Electrode material 82 and alignment material 88 is shown atop peaks 92. This may occur where it is difficult to avoid depositing these materials on the spacing ribs 76 while depositing them in other areas on the substrate.

Device 70 may also include isolation grooves 94 molded into the substrate adjacent spacing ribs 76. The purpose of the isolation grooves is to reduce the possibility of electrical contact between adjacent electrodes on substrate 72. The grooves are shown located on both sides of the spacing ribs, but are also effective if located on only one side of each spacing rib. Two grooves further minimize the chance of an electrical short. The dimensions are not critical other than that the grooves be narrow enough and deep enough to prevent deposition in the groove of the conductive electrode material deposited on the substrate. Typically, the grooves are about 15 micrometers deep and 5 micrometers wide. The walls of the grooves may be straight or angled on one or both surfaces. Generally, the molding technique employed benefits from angling of at least one of the walls to facilitate release from the mold. Where spacing means other than parallel ridges are employed, the grooves may be in the form of other than parallel grooves. Thus, if discrete posts are used as spacing elements, the grooves may be in the form of a circumferential moat at the base of the post.

FIG. 4 shows a portion of a display device 100 comprising bottom and top substrates 102 and 104, spacing ribs 106(*a*) through 106(*f*) are shown, but in practice a large number of ribs are generally included and the number increases as the areal dimensions of the cell increase. Electrode materials 108 and 110, alignment materials 112, 114 and 116, and adhesive/sealant 118 are also shown. In this embodiment, the surface of the bottom substrate to which the electrodes are applied is not uniform. The microstructural features included on the substrate may be used to provide gray scale capability in a ferroelectric liquid crystal display by varying the space between the top and bottom substrates and hence, the effective field intensity for a given applied voltage. Because ferroelectric liquid crystals are either on or off, their contrast does not vary progressively with field intensity. However, by varying the spacing between electrodes in different areas of the pixel, the area of each pixel which is switched with a given applied voltage can be varied so that the eye averages the switched and unswitched areas to provide varying levels of gray between full off and full on.

In the embodiment shown in FIG. 4, the substrate surface between spacing ribs 106(*a*) and 106(*b*) has peaks 120 and valleys 122 extending transversely parallel to spacing ribs 106. Two peaks are shown for simplicity of illustration, but more peaks are generally preferred with about 10 peaks within a 250 μm×250 μm pixel providing good gray scale control. In practice, when a voltage is applied to the pixel and slowly increased, the portion of the ferroelectric liquid crystal over the peaks will switch first because the field is most intense there. If the voltage is held at the point where switching just begins each individual pixel will appear as stripes of switched (e.g. dark) and unswitched (e.g. light) liquid crystal. The eye will average the switched and unswitched areas and perceive a certain level of gray. If the voltage is increased above the threshold level where switching just begins over the peaks, the stripe of switched area will broaden as the field intensity adjacent the peaks increases and more of the liquid crystal is switched. The eye will average the switched and unswitched areas to perceive a new level of gray. The voltage can be increased to whatever level desired until all of the pixel area is switched to exhibit a full on or off state. By this method, various levels of gray can be achieved with ferroelectric liquid crystals. Generally it has been found that a peak to valley height difference of about 10% of spacer height is useful for achieving good gray scale control. Lower heights may not be effective depending on the switching characteristics of the liquid crystal, the stability of the display environment, e.g. temperature, and the precision with which the voltage can be controlled.

An alternative gray scale feature is shown with respect to the surface 124 between spacing ribs 106(*b*) and 106(*c*), being gradually sloped from left to right rather than undulating as is the surface in the channel to the left. In this embodiment, the pixels would become shaded from left to right as the field intensity is increased. The effect is more coarse to the eye than the multi-striped pattern obtained with the peaks described above. Other configurations having varying heights may also be useful depending on the effect to be achieved and their ease of manufacture.

In yet another embodiment, the combination of surfaces 126, 128 and 130 illustrate a means of utilizing microstructure features to provide improved color displays. In this embodiment, electrode surfaces 126, 128 and 130 of adjacent pixel areas are shown at three different heights relative to one another and to top electrode 110. A different colored optical filter materials 132, 134 and 136, e.g., red, green and blue, is included in each of the channels above these surfaces. The maximum color intensity can be achieved if the depth (d) of the liquid crystal material in the cavity is one-half the dominant wavelength ($\lambda$) for the light passing through the filter. Thus, the optimum value for (d) is given by the formula $nd=\lambda/2$ where n is the index of refraction of the liquid crystal material in its transmitting state at the dominant wavelength.

While the cross section in FIG. 4 shows a variety of features in a single display for purposes of illustration, a single display might not utilize all of the features or might use combinations other than shown.

Figure 5:
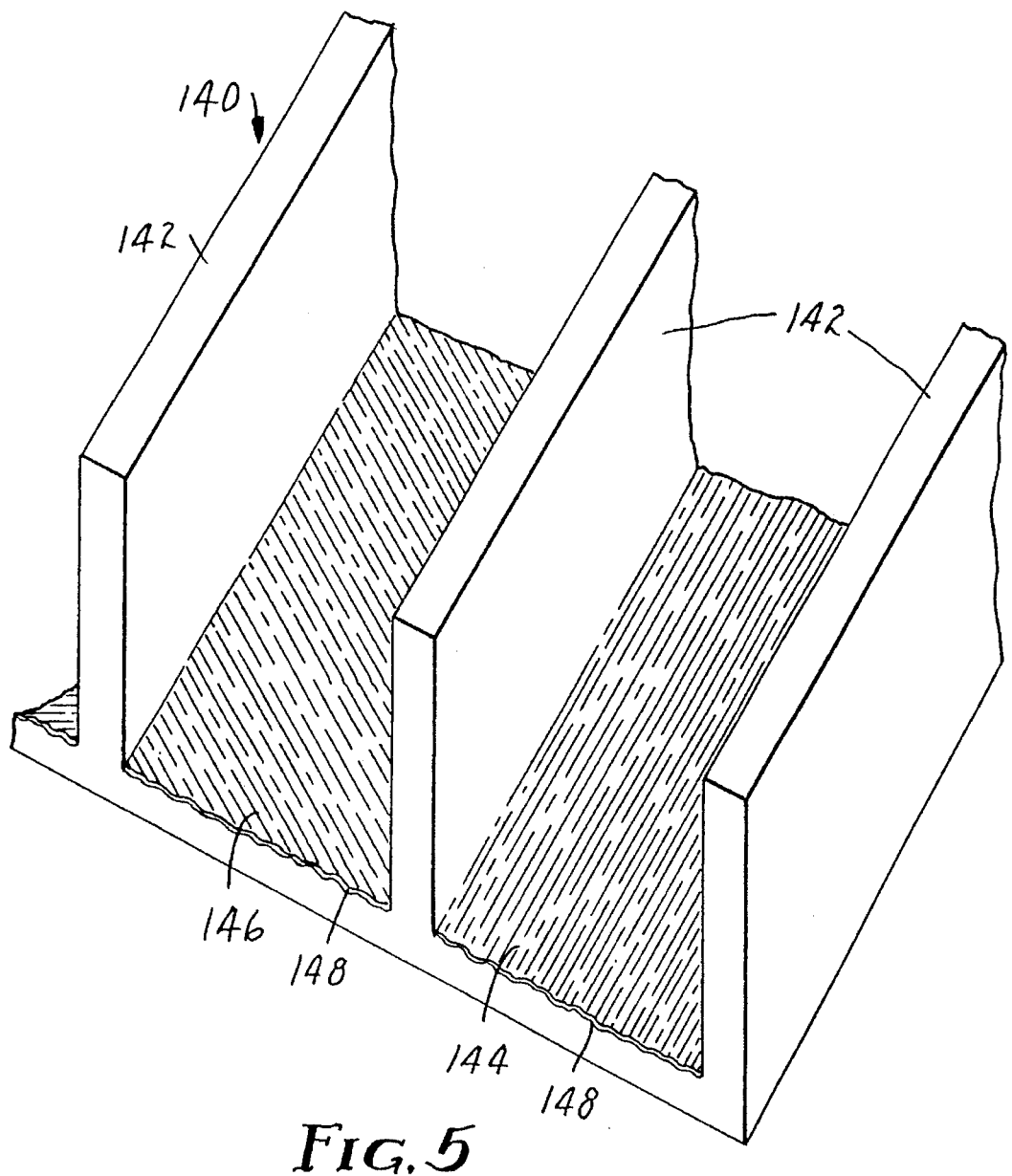
FIG. 5 is a partial, isometric view of a liquid crystal device substrate having microstructure alignment features according to the present invention.

FIG. 5 shows a microstructured LCD substrate 140 according to the present invention wherein the alignment layer shown in FIG. 2 at 62 and 66 is omitted, but a similar effect is achieved by providing a directional pattern of grooves on the surfaces 144 and 146 in the channels between spacing ribs 142 of bottom substrate 140 to provide an orienting surface. The groove pattern may comprise continuous parallel grooves or a less regular, but still generally directional, pattern of grooves such as made by the pass of a roughened or "raggy" tool in finishing the mold surface. Typically the grooves could have a depth of from about 10 to 30% of the height of the spacing ribs, e.g., from about 1 μm to about 3 μm. Surfaces 144 and 146 are grooved to provide an orienting effect in the direction shown by the lines extending parallel to (144) or at an angle (146) to the spacing ribs 142. When these orienting grooves are included in the substrate 140, even though covered with a conducting material 148, the molecules of the liquid crystal material placed into the cell will preferentially align as shown. The top substrate (not shown) may also include orienting grooves arranged in a complementary manner whether or not it has spacing ribs thereon. Use of these orienting grooves avoids the need for applying separate alignment layers of the conventional type and rubbing of the alignment layer to align the liquid crystal molecules.

Figure 6:
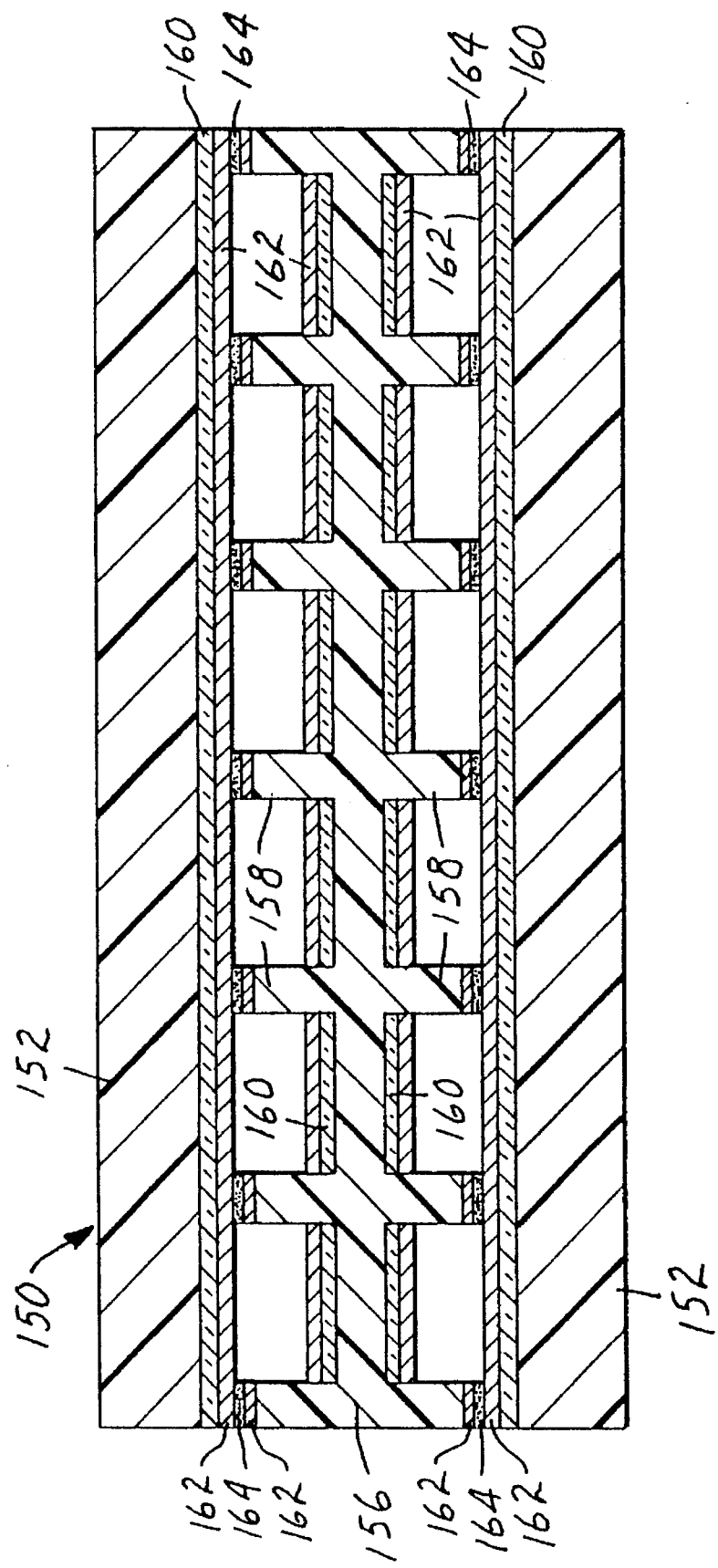
FIG. 6 is a cross section of a liquid crystal display device containing two separate liquid crystal layers with an intermediate separation and spacing element according to the present invention.

FIG. 6 shows yet another embodiment of the present invention wherein a portion of a display device 150 is shown comprising multiple layers of liquid crystal material. Top and bottom substrates 152 are spaced apart and bonded to the microstructured intermediate member 156 with spacer ribs 158 on both major surfaces of member 156. Electrical conducting materials 160, alignment materials 162 and adhesive/sealant 164 are shown as previously described. Liquid crystal material (not shown) is included in the cavities formed within the cell.

The microstructured liquid crystal display elements of the present invention can be made by a microreplication technique utilizing embossing or injection molding. This process is known in the art and is described in U.S. Pat. No. 3,689,346, U.S. Pat. No. 4,244,683 and U.S. Pat. No. 4,576,850, the disclosures of the process being hereby incorporated by reference. Basically, the process involves the preparation of a microstructured mold master using conventional techniques. The mold master is then filled with a polymerizable composition which is exposed to radiation to rapidly polymerize the composition. The polymerized composition is then removed from the mold master to provide a polymerized article which has a microstructured surface replicated from the mold master.

When an article is to be molded with microstructures on both major surfaces, a closed, transparent mold is employed so that the material can be polymerized, the mold opened and the microstructured element removed.

To demonstrate the microreplication process in the present invention, tooling masters were cut from copper alloy using a conventional diamond turning lathe. Nickel submaster tools were then fabricated from them aster tools by electroplating. Each tool measured about 4 inches by 8 inches and contained two microreplicated spacer patterns of slightly different spacer rib height, each pattern being about 2 inches wide and running the full length of the tool. The spacer ribs were of rectangular cross section measuring 25 micrometers in width and 2.5 micrometers in height in one case and 2.8 micrometers in height in another case. The ribs were spaced laterally at a density of 300 ribs per inch on center (118 ribs per centimeter or 118 pixels per cm) with an active pixel area of about 70%. Two different spacer rib heights were included to accommodate possible relaxation of the plastic microstructure during bonding under pressure to a mating display substrate. A second tool was made identical to the first except for the addition of a peaked profile to the top of the spacer cavity to provide ribs as shown in FIG. 3 of the drawing.

The submaster tools were then used to make the microstructured, plastic spacer substrates using either one of two alternate processes. In the first process, a urethane-acrylate prepolymer resin was cast onto the submaster tool. The resin was overlaid with a polyester or polycarbonate film to act as a release liner as well as to impart a smooth surface to the topside of the resin after curing. The resin was then cured by exposing it to ultraviolet radiation of 340 to 380 nm wavelength for about 1 minute. In a second process, a polycarbonate film (General Electric Number 8050) was directly embossed at 170° C. using a heated submaster tool at 100 psi.

The microstructured plastic substrates were sputter coated with a 2000 Angstrom thick coating of transparent, electrically conducting indium tin oxide (ITO). The ITO film was then overcoated with a 500 Angstrom thick layer of silicon dioxide by vacuum deposition.

A second substrate was prepared using a commercially available ITO coated glass substrate having an ITO pattern of parallel lines at a density of 100 lines per inch (39.4 lines per centimeter). The patterned substrate was spin coated with a 500 Angstrom thick layer of Nylon polymer layer. The Nylon was 0.5% Elvamide Nylon Multipolymer Resin (DuPont) in a solution of 60:40 m-cresol:methanol filtered through a 0.2 micrometer PTFE filter. The spin rate was 500 rpm for 2 seconds followed by 60 seconds at 1200 rpm. The coated substrate was baked for 0.5 hours at 60° C. followed by several hours at 70° C.

Using conventional methods the Nylon layer was lightly brushed in one direction with dry velvet cloth in order to impart an alignment surface.

The plastic and glass substrates prepared as described above were then mated by putting the coated surfaces in contact, placing the glass surface of the assembly on a laboratory hotplate held at about 90° C. and bonding the assembly on three sides using a UV curable adhesive (Optical Adhesive #68 available from Norland Products, Inc.). The elevated temperature was used because the microstructured plastic substrate has a higher coefficient of thermal expansion than the glass substrate and it is necessary that the plastic not flex during the liquid crystal filling step which is also carried out at elevated temperature and which is described hereinafter.

The assembly was filled with a ferroelectric liquid crystal material using vacuum filling process common in the LCD industry and described in the "Liquid Crystals-Applications and Uses" reference previously cited. The assembly was then sealed using the UV curable adhesive.

The resulting display, about 1 inch (2.54 centimeters) square provided better than 1 gigaohm electrical isolation between ITO electrodes on each substrate. When filled with fluorine-containing, ferroelectric liquid crystal materials of the type described in U.S. Pat. No. 4,886,619 (Example 174) and placed between crossed polarizers, the display was found to have a contrast greater than 10 to 1 when viewed in projection onto a wall using a commercially available overhead projector.

The use of the tack-off method of applying adhesive to the ribs of a microstructured substrate was demonstrated with two different adhesive systems. The first adhesive was a heat cured epoxy system using a 10% solids solution of an epoxy adhesive (for example, Epon 332 from Shell Chemical) dissolved in a methyl isobutyl ketone (MIBK). This solution was spun onto a polyimide film using a spin speed of 4000 RPM. After air drying for 10 minutes at room temperature, an adhesive film thickness of about 400 nm was obtained. This thin adhesive was then tacked off onto the rib tops by pressing the ribs to the adhesive using a rubber roller. The adhesive coated ribbed microstructure could then be laminated to the mating LCD substrate and fully cured in an oven at 90° C. for two hours.

The second adhesive system was a UV-cured epoxy system using a 9% solids solution of epoxy (Norland #61) dissolved in Type A photoresist solvent. This solution was also spun onto a polyimide film using a spin speed of 4000 RPM. After oven drying for 10 minutes at 60° C., an adhesive film thickness of about 600 nm was obtained. This thin adhesive could then be tacked off onto the rib tops as described above. The adhesive coated ribbed microstructure could then be laminated to the mating LCD substrate and fully cured under a UV-curing lamp.

What is claimed is:

1. A method of selectively applying adhesive to a polymeric substrate having a microstructure profile on at least one major surface of the substrate, said profile comprising a plurality of protrusions having tops which define a plane above and parallel to said substrate, the method comprising the steps of:

applying a layer of transferable adhesive to a flexible, polyimide carrier;

drying said adhesive layer;

pressing said microstructure profile on said substrate onto said adhesive layer so that said adhesive layer contacts said tops of said protrusions but does not contact portions of said substrate between said protrusions; and separating said carrier and said substrate, thereby tacking off those portions of said adhesive layer that contact said protrusions from said carrier and adhering said portions of said adhesive layer to said tops of said protrusions.

2. The method of claim 1, wherein said step of pressing said microstructure profile onto said adhesive layer is accomplished by rolling said microstructure profile across said adhesive layer.

3. The method of claim 1, wherein the step of applying said adhesive layer to said carrier further comprises spin coating said adhesive on said carrier.

4. The method of claim 1, wherein said adhesive is an epoxy adhesive.

5. The method of claim 1, wherein said adhesive is an optically transparent adhesive.

6. The method of claim 1, wherein the adhesive layer is dried to a thickness within the range of from about 0.4. to 0.6 µm.

7. The method of claim 1, wherein said protrusions are ribs having a height within the range of 1 to 10 µm.

* * * * *